United States Patent
Liang (10) Patent No.: US 7,523,501 B2
(45) Date of Patent: Apr. 21, 2009

(54) ADAPTIVE COMPUTER WORM FILTER AND METHODS OF USE THEREOF

(75) Inventor: Jeremy G. Liang, San Jose, CA (US)

(73) Assignee: Trend Micro, Inc. (JP)

( * ) Notice: Subject to any disclaimer, the term of this patent is extended or adjusted under 35 U.S.C. 154(b) by 557 days.

(21) Appl. No.: 10/890,395

(22) Filed: Jul. 12, 2004

(65) Prior Publication Data

US 2005/0039042 A1    Feb. 17, 2005

Related U.S. Application Data

(60) Provisional application No. 60/481,118, filed on Jul. 21, 2003.

(51) Int. Cl.
  G06F 11/00   (2006.01)
  G06F 11/30   (2006.01)
  G06F 12/14   (2006.01)
  G06F 21/00   (2006.01)

(52) U.S. Cl. .............................. 726/24; 726/22; 726/23; 713/187; 713/188

(58) Field of Classification Search .................. 726/24, 726/22, 23; 713/187, 188
See application file for complete search history.

(56) References Cited

U.S. PATENT DOCUMENTS

2004/0064737 A1 * 4/2004 Milliken et al. ............. 713/201
2004/0143749 A1 * 7/2004 Tajalli et al. ................ 713/200
2005/0091514 A1 * 4/2005 Fukumoto et al. ........... 713/188

FOREIGN PATENT DOCUMENTS

EP    1879124 A1 *   1/2008

OTHER PUBLICATIONS

Nicholas Weaver, Vern Paxson, Stuart Staniford, Robert Cunningham, A taxonomy of computer worms, Oct. 2003, WORM '03: Proceedings of the 2003 ACM Workshop on Rapid Malcode, pp. 11-18.*

* cited by examiner

Primary Examiner—Matthew B Smithers
Assistant Examiner—Courtney D Fields
(74) Attorney, Agent, or Firm—Beyer Law Group LLP (57) ABSTRACT

A system identifies computer worms associated with published, or otherwise, known security holes. The system uses a worm pattern developed to identify those data packets most likely to be a computer worm designed to take advantage of a particular security hole. The worm pattern includes a portion used to functionally characterize the computer worm and another portion used to provide a defense mechanism used to thwart the worm attack. In some cases, the defense action is truncating the suspected data word, while in other cases, the suspect data word is stored in a buffer for later investigation. In a particular implementation, the worm patterns are retrieved from a worm pattern update server.

6 Claims, 6 Drawing Sheets

ADAPTIVE COMPUTER WORM FILTER AND METHODS OF USE THEREOF

CROSS REFERENCE TO RELATED APPLICATIONS

This patent application takes priority under 35 U.S.C. 119 (e) to U.S. Provisional Patent Application No.: 60/481,118, filed on Jul. 21, 2003 entitled "ADAPTIVE COMPUTER WORM FILTER AND METHODS OF USE THEREOF" by Liang which is incorporated by reference in its entirety for all purposes.

FIELD OF THE INVENTION

The present invention relates generally to information analysis and screening using a computer, and, specifically, to configurations and methods for intercepting and removing computer worms from transmitted media.

BACKGROUND OF THE INVENTION

With the rising popularity of the Internet, there are now millions of users connecting to the Internet daily from their host computers to conduct e-commerce transactions, perform searches for information and/or download executable programs to enhance the capability and performance of their own host computers. The interaction between these users and the other host servers on the Internet generally involves the transfer of some amount of data, which may include both static displayable information and executable computer codes. Generally speaking, static displayable information refers to static information to be displayed at the host computer while executable code or "executable" refer to computer instructions configured to be executed at the host computer to perform some task.

In general, the vast majority of the downloadable data from the Internet represents useful or at least non-harmful content material. However, there exists a class of executable code that, if downloaded and executed at host computers, may wreak havoc with the operating system, the hardware, and/or other software of the host computers. These executables include what are commonly referred to as computer viruses and worms.

A computer virus is a piece of programming code usually disguised as something else that causes some unexpected and usually undesirable event (for the victim). Viruses are often designed so that they automatically spread to other computer users across network connections. For instance, viruses can be transmitted by sending them as attachments to an e-mail message, by downloading infected programming from other web sites, and/or by importing them into a computer from a diskette or CD-ROM. The source application that deals with the e-mail, downloaded file, or diskette is often unaware of the virus. Some viruses wreak their effect as soon as their code is executed; other viruses lie dormant until circumstances cause their code to be executed by the computer. Some viruses can be quite harmful, causing a hard disk to require reformatting or clogging networks with unnecessary traffic.

Figure 1:
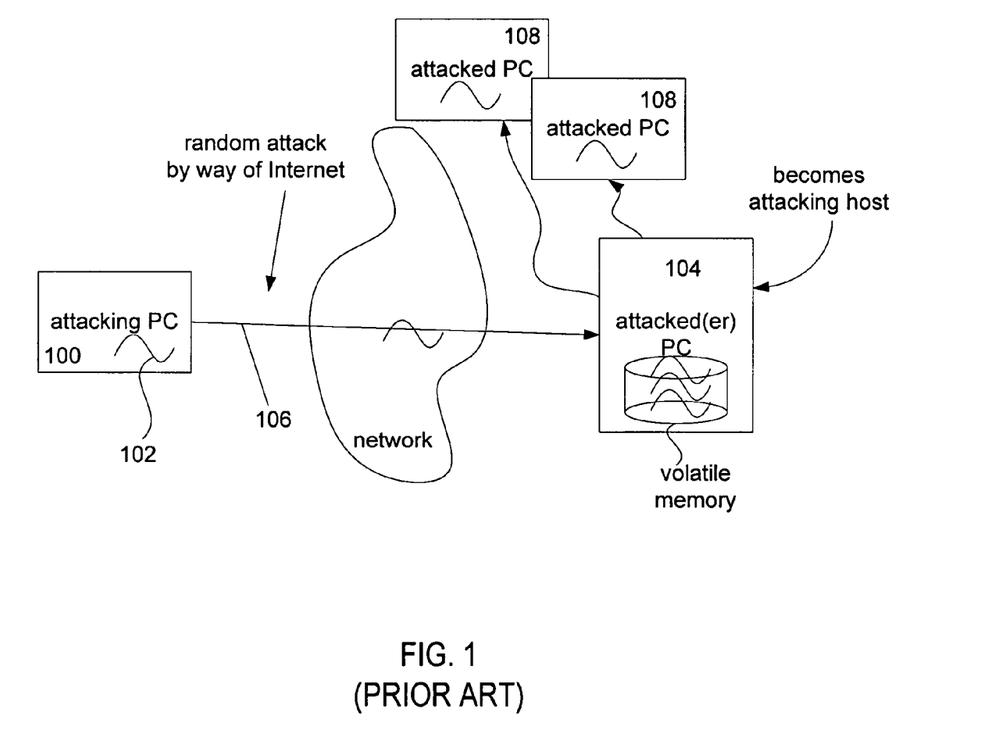
FIG. 1 shows a computer infected with a worm infects another computer by way of an Internet connection.

Computer worms are very similar to viruses in that a worm is a small piece of software that uses computer networks and security holes to replicate itself. A copy of the worm scans the network for another machine that has a specific security hole. Once the security hole has been found, the worm copies itself to the new machine using the security hole, and then uses the newly infected computer to start replicating itself in order to infect other computers connected thereto. Such a situation is shown in FIG. 1 where a computer 100 infected with a worm 102 infects a computer 104 by way of an Internet connection 106. The worm 102 now uses the computer 104 to infect other computers 108 each of which, in turn, are used to infect other computers coupled thereto. Given enough time and computing resources, the worm 102 can infect thousands or even millions of computers in a relatively short time. An example of a particularly virulent worm is the Code Red worm that, at one point, replicated itself over 250,000 times in approximately nine hours. The most common version of Code Red is a variation, typically referred to as a mutated strain, of the original Ida Code Red that replicated itself on Jul. 19, 2001. According to the National Infrastructure Protection Center:

> The Ida Code Red Worm, which was first reported by eEye Digital Security, is taking advantage of known vulnerabilities in the Microsoft IIS Internet Server Application Program Interface (ISAPI) service. Unpatched systems are susceptible to a "buffer overflow" in the Idq.dll, which permits the attacker to run embedded code on the affected system. This memory resident worm, once active on a system, first attempts to spread itself by creating a sequence of random IP addresses to infect unprotected web servers. Each worm thread will then inspect the infected computer's time clock. The NIPC has determined that the trigger time for the DOS execution of the Ida Code Red Worm is at 0:00 hours, GMT on Jul. 20, 2001. This is 8:00 PM, EST.

Upon successful infection, the Ida Code Red worm waits for the appointed hour, connects to the <www.whitehouse.gov> domain, and then each infected computer simultaneously sends 100 connections to port 80 of <www.whitehouse.gov> (198.137.240.91).

Although a worm does not alter files but resides in active memory and duplicates itself, the worm uses parts of an operating system that are automatic and usually invisible to the user. Therefore, it is common for worms to be noticed only when their uncontrolled replication consumes system resources, slowing or halting other tasks.

To combat worms, users and administrators of computer networks (such as corporate local area networks or wide area networks) have long employed a variety of tools designed to detect and block worms from infecting a computer system. In a corporate local area network (LAN), for example, network administrators may employ proxy servers (which are disposed between the host computers of the LAN and the Internet) as well as individual computers to perform any of a number of defense strategies designed to prevent infection by a worm. One such defense strategy relies upon behavioral monitoring of computer actions. In behavioral monitoring, a historical database of actions taken by every computer is maintained that is then used by a monitoring program (heuristic engine) to compare to current actions taken by a particular computer. In those cases where current actions are deemed by the behavior monitoring program to be substantially different from the historical norm, the behavioral monitoring program flags that particular computer as being possibly infected by a worm. Once so flagged, appropriate actions can be taken.

For example, if a particular computer has a historical record of ten port 80 accesses/per hour and if the behavioral monitoring program determines that the request level has risen to, for example, one thousand port 80 accesses/per hour, that particular computer is flagged as possibly being infected by a worm. Unfortunately, behavioral monitoring has a drawback in that a false positive may result when a legitimate user initiates actions by the computer being monitored that would cause the computer to be flagged by the behavioral monitor.

Such situations include sending a relatively large number of e-mail postings which in and of itself is not an issue, but nonetheless causes a behavioral monitor to flag the computer, possibly resulting in unhappy results for the innocent computer user.

Another widely used defense mechanism is referred to as port blocking where a particular port known to be under attack is blocked from receiving any and all traffic. For example, in the case of the Code Red worm, the port 80 of the <www.whitehouse.gov> website is blocked thereby thwarting the Code Red worm attack. Unfortunately, however, even though blocking port 80 stops the Code Red attack, it also blocks any and all legitimate traffic to the port 80 of the <www.whitehouse.gov> site.

Figure 2:
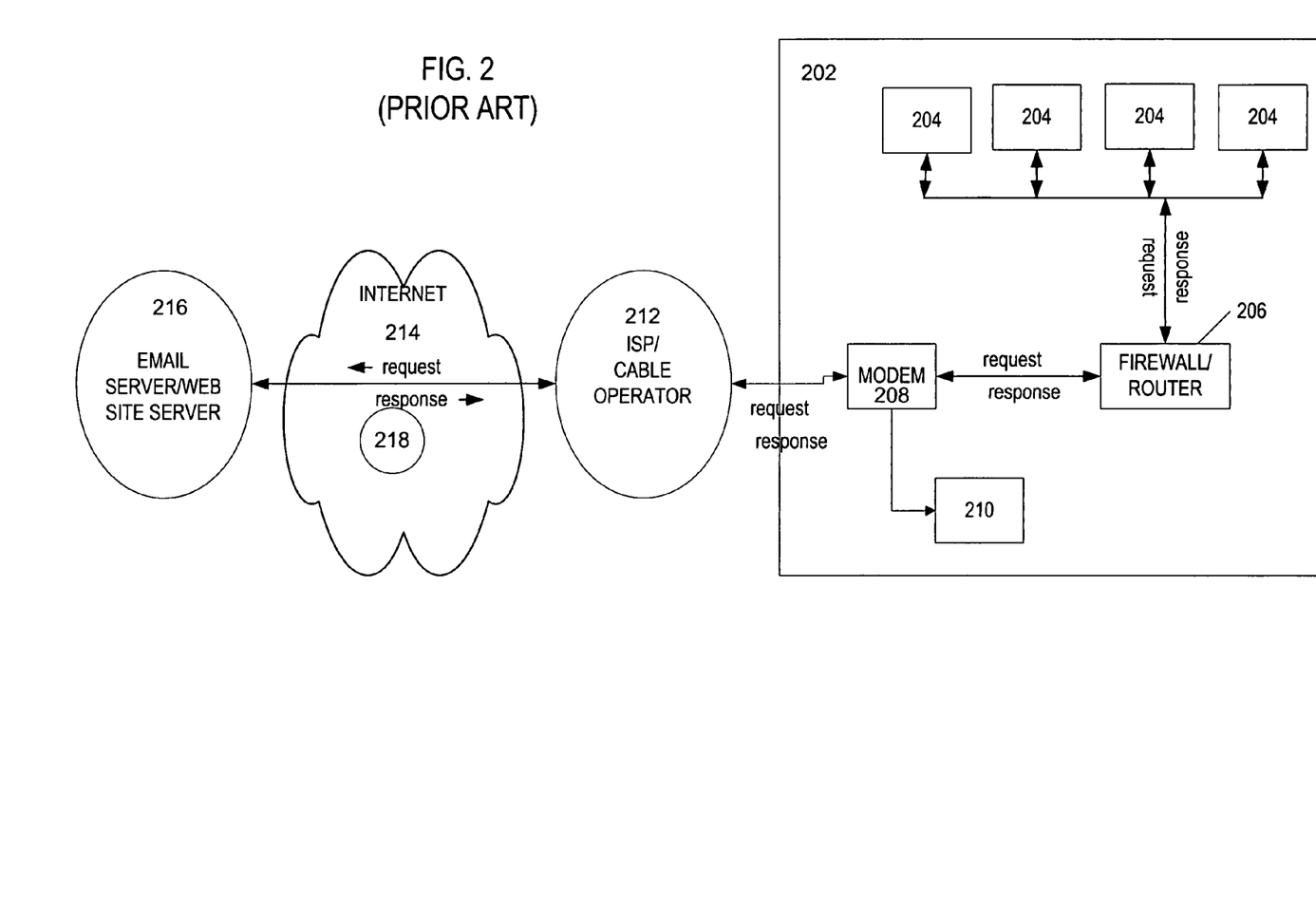
FIG. 2 is an example of a system for providing protected against computer worms according to one embodiment of the present invention.

Yet another well known approach to defending computer systems from worm attacks is known as generic filtering that relies upon a firewall and/or proxy server to apply specific rule or rules to incoming traffic. To illustrate, FIG. 2 depicts, in a simplified schematic format, a corporate environment 202 within which multiple host computers 204, 206, and 208 are interconnected via a local area network (LAN) 210. LAN 210, in addition to allowing the host computers to exchange data among themselves and/or other I/O devices or storage devices connected thereto, also facilitates data transfer between the host computers and the distributed computer network 212 (such as the Internet). As shown in FIG. 2, a proxy server 214 is interposed between LAN 210 and distributed computer network 212 to monitor data transfers between distributed computer network 212 and the host computers connected to LAN 210.

In the current art, one of the more popular application protocols for data transfers via the world wide web (WWW) is the Hypertext Transfer Protocol (HTTP). Thus, for data transfers via the world wide web, proxy server 214 typically implements the HTTP protocol. There is also shown in proxy server 214 a scan engine 216, representing the software and/or hardware portion configured to detect computer worms that may be present in the HTTP data transfers. When a host computer, such as host computer 104, wishes to download data from one of the web servers connected to distributed computer network 212, e.g., one of web servers 220, 222, or 224, the data transfer there from traverses proxy server 214 and is scanned by scan engine 216 utilizing a particular generic filter(s) as part of the proxy server's rule set to ensure that the data transfer is free of worms.

One such generic filter checks every buffer and compares each to incoming packet(s)s and if the incoming packet(s) is greater than the available buffer space, then the firewall will truncate the packet or, more likely, will stop the packet altogether. Another specific rule determines if there have been a number of unsuccessful password attempts. Once that number exceeds a threshold, the firewall refuses any further incoming traffic from the originator. Although somewhat effective, generic filtering requires intricate knowledge of the system and/or program being protected. Such information is typically only readily available in open source systems that at the present time represents but a small percentage of available programs. For example, it would be extremely unlikely that an effective generic filter could be devised in a closed source system since it would be difficult to know a priori the size of the various buffers, the size at which a buffer would overflow would not be known and thwarting buffer overflow-type worm attacks would be unlikely.

In any case, once a computer has been infected, the infected computer must be detached from the Internet (or whichever connection used by the worm to infect the computer), the computer must then be rebooted in order to purge the worm from memory. Unfortunately, at this point the now clean computer must be re-connected to the Internet in order to obtain the patch used to "fix" the security hole. Once obtained, the patch must be applied in order to provide the appropriate protection. Unfortunately, once the computer is reconnected to the Internet, the worm can re-infect the computer at any time prior to the application of the patch without the knowledge of the computer user, thereby obviating the security patch in the first place.

In view of the foregoing, there are desired improved techniques for enabling distributed worm filtering on data transfers between a distributed computer network and the host computers.

SUMMARY OF THE INVENTION

To achieve the foregoing, and in accordance with the purpose of the present invention, a system and method for creating patterns used to detect a specific worm corresponding to a known security hole are described. The present invention utilizes a publicly known security hole to develop a specific worm pattern. The worm pattern includes a worm characteristic portion used to identify those incoming data packets having characteristics likely to be those consistent with a worm.

In some embodiments, the worm characteristic portion includes a pointer that points to, or otherwise identifies an action portion indicative of an action to be taken in those situations where an incoming packet(s) matches (or hits) the worm characteristic portion. In some cases, the characteristic action truncates the incoming packet(s) while in other cases the incoming packet(s) is denied entry. In any case, the worm is prevented from infecting the protected system.

According to one aspect of the present invention, a scan engine for detecting a specific worm using a worm pattern corresponding to a known security hole is described. In one embodiment, the scan engine is directly coupled to an input node, such as a port, arranged to receive incoming data packets from a network coupled thereto. The incoming data packet is sent to a parser unit coupled to the incoming port. The parser unit examines the incoming data packet and identifies those portions of the data packet likely to match a worm pattern included in a worm pattern database populated by a number of worm patterns each of which is based upon a known security hole. Each of the portions of the incoming data packet is then passed to a comparator unit coupled to the database that determines whether or not the incoming data packet matches any of the known worm patterns. In those cases where there is no match, then the incoming packet(s) is allowed to pass whereas in those cases where the comparator has determined that there is a match to one of the worm patterns, a defensive action module is notified. Based upon the specific worm pattern, the defensive action module will deal with the offending incoming packet(s) in any number of ways. In one embodiment, the incoming data packet is truncated with the remaining portion of the data packet allowed to pass. In other embodiments, however, the data packet is terminated.

In another embodiment, a method of detecting a computer worm based upon a published security hole is described. Accordingly, once a security hole has been identified, a computer worm pattern is created based upon the published security hole. The worm pattern is then used to filter each incoming data packet. In those cases where the incoming data packet matches the computer worm pattern, a defensive action based upon the particular computer worm pattern is taken thereby protecting the computing system from being infected by the computer worm.

These and other aspects and advantages of the present invention will become apparent upon analysis of the following detailed description and studying the various figures and drawings.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail so that the present invention will not be unnecessarily obscured in any way, for example, decoding and re-encoding of messages, basic transmission protocols and pathways, and applications are not described in detail.

The present invention provides techniques for creating patterns used to detect a specific worm corresponding to a known security hole. The present invention utilizes a publicly known security hole to develop a specific worm pattern. The worm pattern that identifies a worm characteristic portion used to identify those incoming data packets having characteristics likely to be those consistent with a worm. The worm pattern also includes a pointer (or other such identifier) that points to or otherwise identifies an action portion indicative of an action to be taken in those situations where an incoming packet(s) matches (or hits) the worm characteristic portion. In some cases, the characteristic action truncates the incoming packet(s) while in other cases the incoming packet(s) is denied entry. In any case, the worm is prevented from infecting the protected system.

In one implementation of the invention, a computing system is protected by a scan engine arranged to detect a specific worm corresponding to a known security hole is described. The scan engine can be implemented as a stand alone module or as part of a computing system. In any case, the scan engine is directly coupled to an input node, such as a port, arranged to receive incoming data packets from a network coupled thereto. Once received, the incoming data packet is sent to a parser unit coupled to the incoming port. The parser unit examines the incoming data packet and identifies those portions of the data packet likely to match a worm pattern included in a worm pattern database. In the described embodiment, the worm pattern database is populated by a number of worm patterns each of which is based upon a known security hole. Once parsed by the parser, the worm characteristic portion of the worm pattern is compared to an appropriate portion of the received data packet at a comparator unit coupled to the database. Accordingly, the comparator determines whether or not the incoming data packet (or an appropriate portion thereof) matches any of the known worm patterns. In those cases where there is no match (i.e., a miss), the incoming packet(s) is allowed to pass through to computing system for further processing. However, in those cases where the comparator has determined that there is a match (i.e., a hit) to one of the worm patterns, a defense action module is notified. Based upon the specific worm pattern, the defense action module deals with the offending incoming packet(s) in any number of ways. In one embodiment, the defense module truncates the incoming data packet with the remaining portion of the data packet allowed to pass. In other embodiments, however, the data packet is terminated by being stored in a data buffer, for example, for further analysis or simply trashed.

The invention will now be described in terms of a computing system coupled to a network of interconnected computing systems. Such interconnected systems include the Internet, LANs, WANs, etc. in either wired or wireless configurations.

Figure 3:
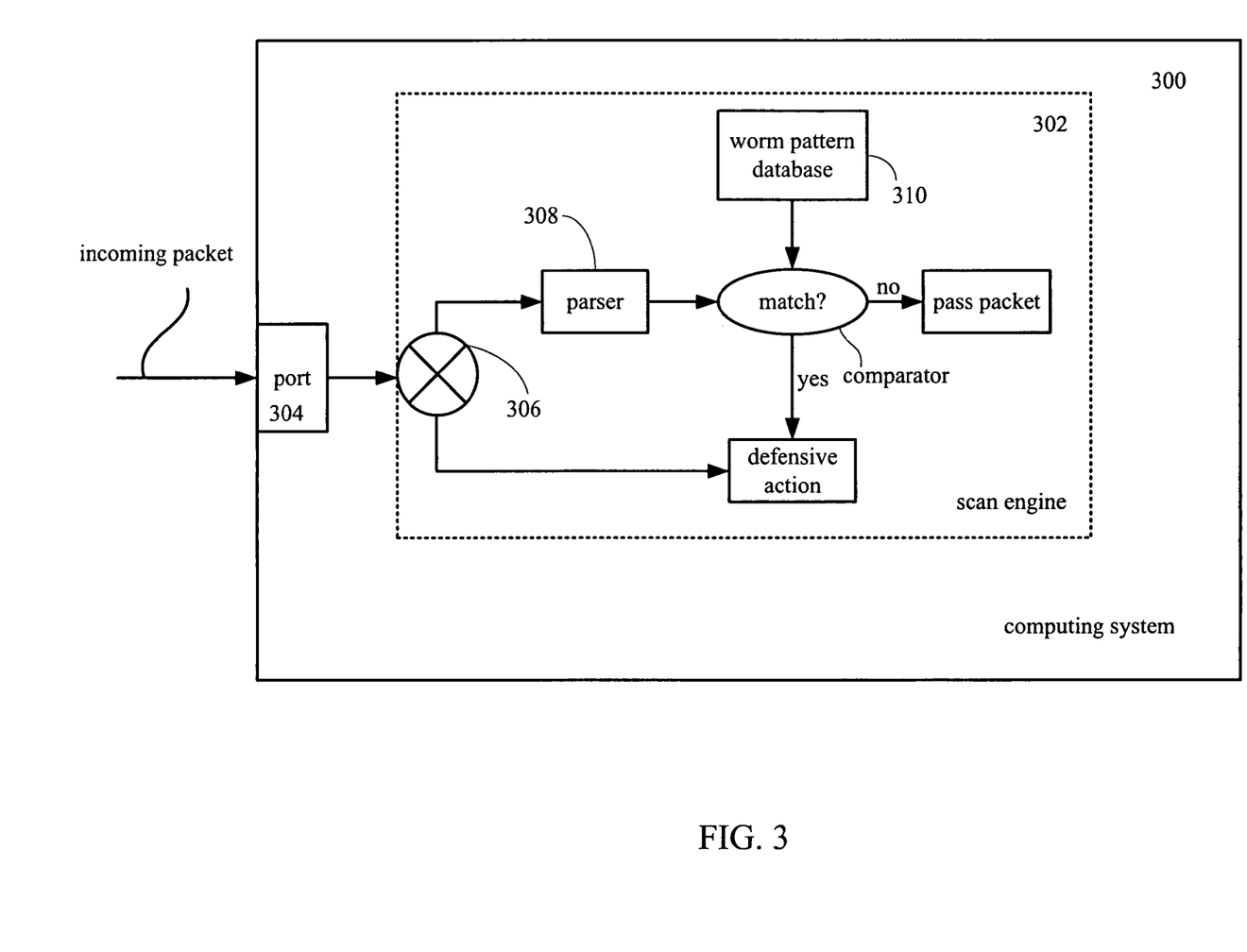
FIG. 3 shows a computing system having a scan engine in accordance with an embodiment of the invention.

Accordingly, FIG. 3 shows a computing system 300 having a scan engine 302 in accordance with an embodiment of the invention. In the context of this discussion, the computing system 300 can include, but is not limited to, desktop computers, laptop computers, servers, etc. or any other such device capable of communicating with another computing system. In the system 300, the scan engine 302 is directly coupled to an I/O port 304 capable of receiving/sending data packets from/to a network (not shown) coupled thereto. In the described embodiment, the scan engine 302 is coupled directly to the port 304 at an input buffer 306 that stores the incoming data packet. It should be noted that in some implementations of the invention, the input buffer 306 is not required if the processing of the data packet is performed in parallel mode. The data buffer 306 is in turn coupled to a parser 308 arranged to parse the incoming data packet in such as way as to be able to compare relevant portions thereof to a various worm patterns stored in a worm pattern database 310.

Figure 4:
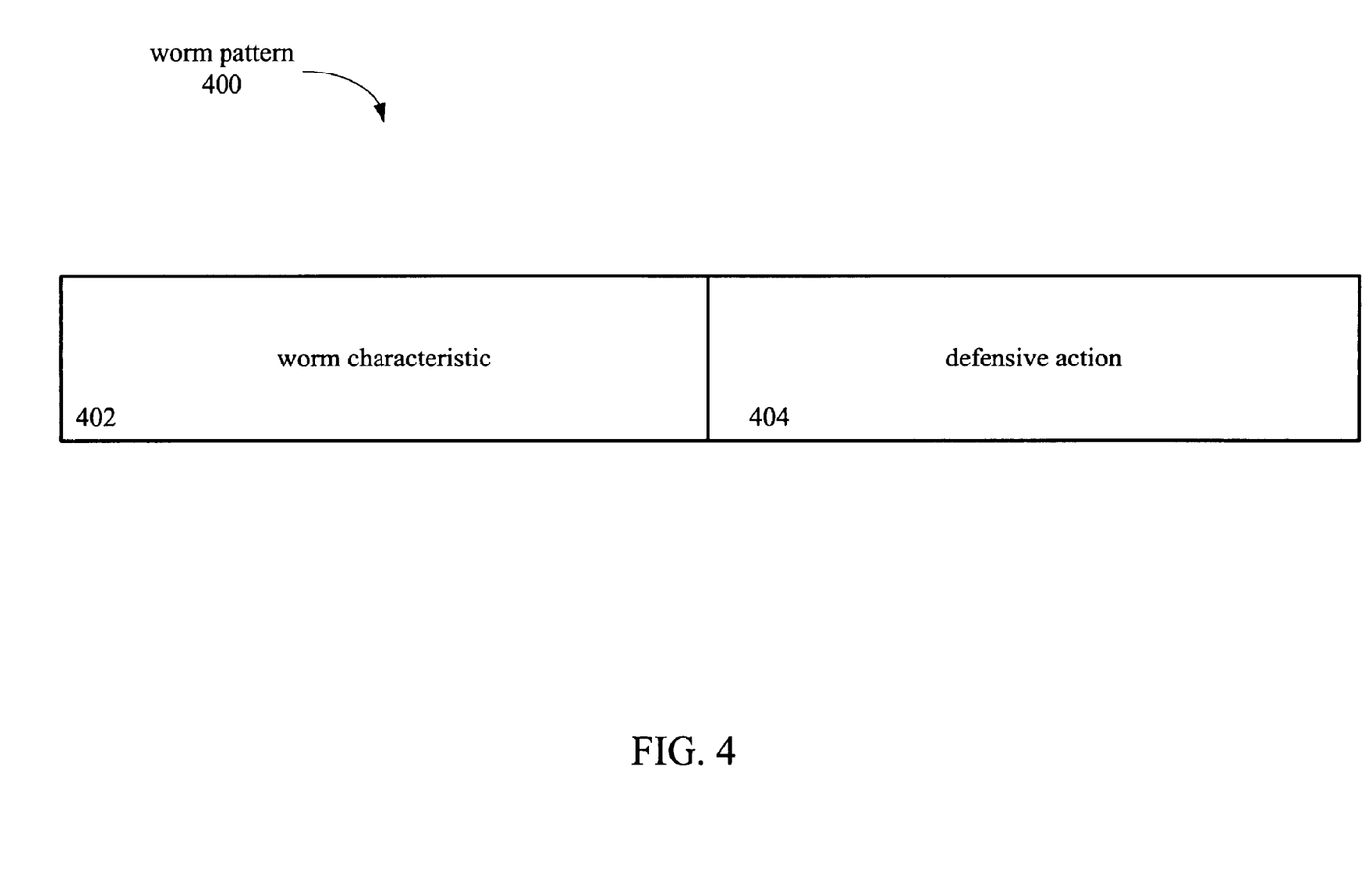
FIG. 4 shows a representative worm pattern in accordance with an embodiment of the invention.

Although a worm pattern can take any appropriate form, a typical worm pattern is shown in FIG. 4 having a worm characteristic portion 402 and an action portion 404. As constituted, the worm characteristic portion 402 is that portion of the pattern 400 that helps to identify specific data packets as those most likely to be a computer worm. For example, with the Code Red worm, the data packet(s) that constitutes the worm could include at least the following text string:

<http/www.trend.com/name.idx> indicating that index server "name" is the specified target of the worm. It should be noted, that it is highly unusual for any index server to be a requested destination unless, of course, the purpose of the request is to institute a worm attack on the receiving computing system.

In this particular case, the Code Red worm attacks a particular index server (i.e., name.idx) associated with the <www.trend.com> website. Accordingly, the Code Red worm pattern would be cognizant of the fact that any data packet having a particular index server as a destination is suspect. In this case, the characteristic portion 402 of the worm pattern 400 would include at least the text string "name.idx" or any other index server as a suspect destination.

Referring back to FIG. 3, since there are many published security holes, the database 310 includes any number of worm patterns each of which is associated with at least one of the publicly known security holes. Therefore, the database 310 can be immediately updated whenever a security hole has been identified such that the computing system 300 can be protected immediately from any worms that have been engineered to take advantage of the security hole. In this way, the computing system 300 can be protected from the computer worm without installing a security hole patch which may takes many months to implement and ultimately install in the computing system 300. In this way, a security patch can be installed with the assurance that the computer will not be re-infected during the install process. It should be noted that if the computing system 300 takes the form of a proxy server, firewall, etc. than by utilizing the appropriate worm pattern, all computers connected thereto are also protected.

In those cases where the incoming data packet matches at least one of the worm patterns stored in the worm pattern database 310, the scan engine 302 acts on the suspect data packet based upon the action data field 404 included in the worm pattern 400. The action identified by the defensive portion 404 can direct the scan engine 302 to take any number of protective actions such as truncating the data packet, terminating the data packet, or directing the data packet to another system for analysis, if so desired. However, in those cases where the compared data packet does not match (i.e., a miss) any of the worm patterns stored in the database 310, the scan engine 302 passes the "clean" data packet to the computing system 300 for processing.

Figure 5:
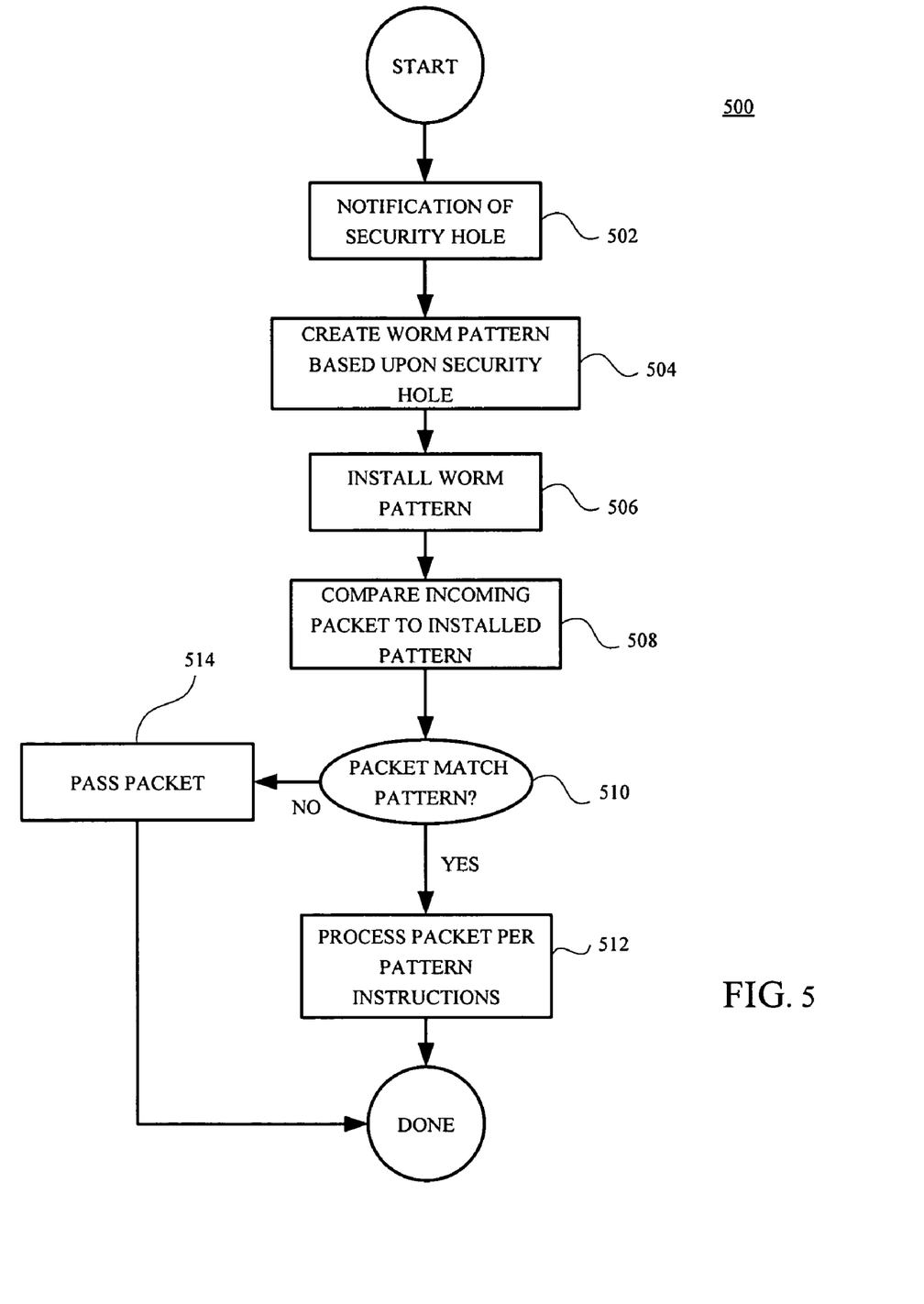
FIG. 5 describes a process for protecting a computing system in the form of a flowchart in accordance with an embodiment of the invention.

FIG. 5 describes a process 500 for protecting a computing system in the form of a flowchart in accordance with an embodiment of the invention. Accordingly, the process 500 begins at 502 with the notification of a security hole. Such security holes provide unauthorized access to software programs such as applications or operating systems. In the case of computer worms, the security hole provides a computer hacker with the wherewithal to insidiously install a worm in the form of functional software that forces the infected system to perform specific tasks that ultimately result in substantial performance degradation and infection of other systems. Therefore, once a particular security hole has been identified, a worm pattern is developed at 504 that specifically identifies a structure that a computer worm would most likely take to be able to take advantage of the security hole. In one embodiment of the invention, the worm pattern includes a worm characteristic data field and in some embodiments a pointer to an action data field used to, respectively, identify the computer worm based upon the perceived worm structure and a corresponding action to be taken when a worm has been identified. Once the worm pattern has been created, a comparator compares any received data packet at 506 while at 508, a determination is made based upon the compare operation whether or not the data packet is a hit or a miss. By hit it is meant that an element of the data packet matches the worm pattern in contrast to a miss where there is no apparent match. In the case of a hit, the suspect data packet is processed at 510 according to the action prescribed in the action data field of the worm pattern. Such actions can include truncating the data packet or terminating the data packet entirely. In some cases, however, the data packet may be stored in a buffer (also referred to as quarantining) for later analysis.

In the case of a miss, however, the data packet is passed to the computing system for further processing at 512.

Figure 6:
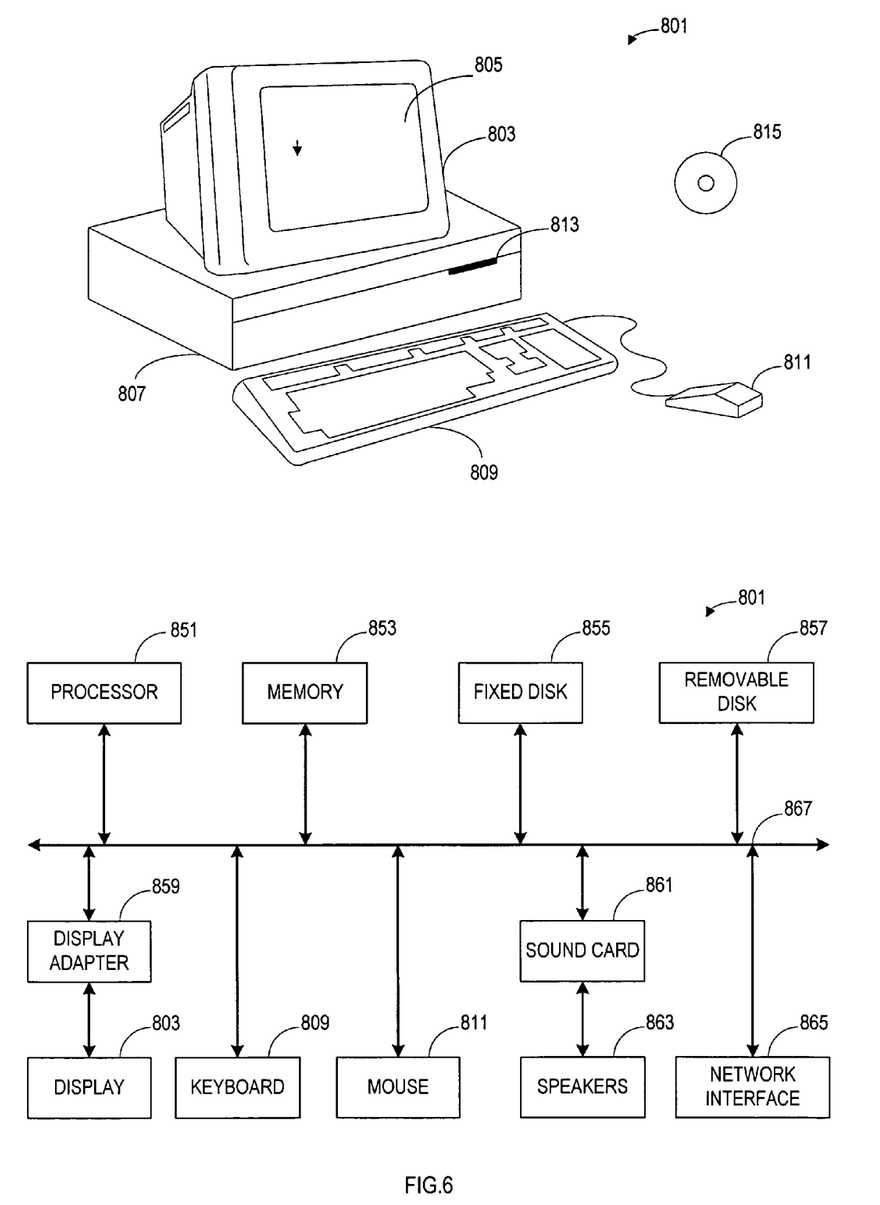
FIG. 6 shows a system block diagram of a computer system used to execute functions of the present invention including the scanning, deletion, truncation, and quarantine of data packets suspected of harboring computer worms, used by the present invention.

FIG. 6 shows a system block diagram of a computer system 801 which may be to implement the computing system 300 used to execute functions of the present invention including the scanning, deletion, modification, and quarantine of data packets suspected of harboring computer worms. The computer system 801 includes display monitor 803 and keyboard 809, and mouse 811. Computer system 801 further includes subsystems such as a central processor 851, system memory 853, fixed storage 855 (e.g., hard drive), removable storage 857 (e.g., CD-ROM drive), display adapter 859, sound card 861, speakers 863, and network interface 865. The central processor 851, may execute computer program code (e.g., an operating system) to implement the various aspects of the scan engine of the present invention as described herein. The operating system is normally, but not necessarily, resident in the system memory 853 during its execution. Other computer systems suitable for use with the invention may include additional subsystems or fewer subsystems. For example, another computer system could include more than one processor 851 (i.e., a multi-processor system) or one or more levels of cache memory.

The system bus architecture of computer system 801 is represented by arrows 867. However, these arrows are illustrative of any interconnection scheme serving to link the subsystems. For example, a local bus could be utilized to connect the central processor to the system memory and display adapter. Computer system 801 shown in FIG. 6 is but an example of a computer system suitable for use with the present invention. Other computer architectures having different configurations of subsystems may also be utilized.

Although a worm filter has been described, it can be appreciated that those skilled in the are often interchange terminology with regard to malicious code. Thus, the term "computer worm" can include any type of malicious or otherwise undesirable or unexpected computer code that presents itself at a computer, whether the code is actually referred to as a "virus", "worm", "trojan horse", and the like. Further, although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

I claim:

1. A method of providing computer worm protection, comprising:

being notified of a security hole;

developing a worm pattern based on the security hole, wherein a structure of the worm pattern that is likely to be taken by a computer worm in order to take advantage of the security hole is created;

updating a computer worm database with the worm pattern;

receiving a data packet at an input port;

parsing said data packet into a parsed data word;

comparing a portion of said parsed data word to a computer worm identifier data word retrieved from the computer worm database, wherein the computer worm identifier data word includes a worm characteristic portion functionally descriptive of said computer worm and a defense portion indicative of said computer worm defense action;

declaring a hit when said parsed data word substantially matches said computer worm identifier data word; and in response to said hit, providing a specific worm defense action based upon said computer worm identifier data word; and wherein the computer worm database is updated immediately with the worm pattern without the need for installing a security patch, thereby avoiding the possibility of being infected during an installation process.

2. The method of claim 1 wherein said input port is connected to a network of interconnected computers.

3. The method of claim 1, wherein said defense action includes truncating said data packet.

4. The method of claim 1, wherein said defense action includes sending said data packet to a garbage collector.

5. The method of claim 2, wherein said method is performed by a proxy server.

6. The method of claim 2, wherein said method is performed by a firewall.

* * * * *